United States Patent [19]
Hamming

[11] Patent Number: 6,079,651
[45] Date of Patent: Jun. 27, 2000

[54] TAPE COUPLING ARRANGEMENT FOR SINGLE REEL CARTRIDGE

[75] Inventor: John A. Hamming, Laguna Niguel, Calif.

[73] Assignee: Seagate Technology, Inc., Scotts Valley, Calif.

[21] Appl. No.: 08/956,645

[22] Filed: Oct. 23, 1997

Related U.S. Application Data

[60] Provisional application No. 60/048,265, Jun. 2, 1997.

[51] Int. Cl.$^7$ ...................................................... G03B 1/58
[52] U.S. Cl. ..................................... 242/332.4; 242/332.8; 242/532.1; 242/532.7; 242/582; 360/132
[58] Field of Search ............................... 242/332.4, 332.7, 242/332.8, 532.1, 532.6, 532.7, 582; 360/95, 132

[56] References Cited

U.S. PATENT DOCUMENTS

| | | |
|---|---|---|
| 4,330,096 | 5/1982 | Bartel et al. . |
| 4,608,614 | 8/1986 | Rinkleib et al. . |
| 4,646,177 | 2/1987 | Sanford et al. . |
| 4,679,747 | 7/1987 | Smith . |
| 4,826,101 | 5/1989 | Smith . |
| 4,972,277 | 11/1990 | Sills . |
| 4,987,504 | 1/1991 | Inoue . |
| 5,034,842 | 7/1991 | Turgeon . |
| 5,155,639 | 10/1992 | Platter . |
| 5,202,809 | 4/1993 | Dodt . |
| 5,219,129 | 6/1993 | Spicer et al. . |
| 5,379,167 | 1/1995 | Robles et al. ........................ 360/132 X |
| 5,454,681 | 10/1995 | Baur . |
| 5,542,620 | 8/1996 | Ohshita . |

FOREIGN PATENT DOCUMENTS

| | | | |
|---|---|---|---|
| 1547015 | 10/1969 | Germany | 242/332.4 |
| 1114950 | 6/1986 | Japan | 242/532.6 |
| 716632 | 10/1954 | United Kingdom | 242/332.4 |
| 1167445 | 10/1969 | United Kingdom | 242/332.4 |
| 9844499 | 10/1998 | WIPO . | |

OTHER PUBLICATIONS

Van den Burg, "Cartridge and Self–Threading Recorder", IBM Technical Disclosure Document vol.10, No. 2, Jul. 1967.

*Primary Examiner*—Donald P. Walsh
*Assistant Examiner*—William A. Rivera
*Attorney, Agent, or Firm*—McDermott, Will & Emery

[57] ABSTRACT

A compact tape drive which can capture the end of a tape which is stored in a single reel cartridge and draw it into an operative position within the drive has a take-up coupler at the end of a flexible leader. This flexible leader is connected at its other end to the take-up hub of the tape drive. The take-up coupler is arranged to engage a coupler which is provided either at the end of the tape in the cartridge, or to an end of a flexible leader which is interposed between the cartridge coupler and the magnetic tape. Upon insertion of the cartridge, the tape drive induces coupling between the take-up and cartridge couplers and winds the take-up leader onto the take-up hub. The take-up hub is provided with a recess arrangement which allows the interconnected couplers to be snugly received in a manner which prevents the circularity of the tape winds from being disturbed.

14 Claims, 20 Drawing Sheets

TAPE COUPLING ARRANGEMENT FOR SINGLE REEL CARTRIDGE

RELATED APPLICATIONS

This application claims priority from provisional patent application Ser. No. 60/048,265 filed Jun. 2, 1997, now expired, entitled "Tape Coupler(s) For Single Reel Tape Cartridge", which is incorporated herein by reference.

TECHNICAL FIELD

The present invention relates to a tape arrangement which includes a single reel cartridge and more specifically, to a tape arrangement that features a coupling arrangement for a single reel cartridge. The arrangement enables an end of the tape in the cartridge to be captured and drawn into an operative position in the tape drive upon insertion of the cartridge into a tape drive.

BACKGROUND ART

A number of single reel cartridge/drive arrangements have been proposed. However, most of these are directed to mass storage systems such as the IBM 3480 system and or are associated with mass storage arrangements such as mentioned in U.S. Pat. No. 4,972,277 to Sills et al. and U.S. Pat. No. 5,454,681 to Baur. Examples of the cartridge/drive arrangements used in the above mentioned systems can be found in U.S. Pat. No. 5,202,809 to Dodt et al.; U.S. Pat. No. 5,155,639 to Platter et al.; U.S. Pat. No. 4,987,504 to Inoue; U.S. Pat. No. 4,826,101 to Smith, and U.S. Pat. No. 4,679,747 to Smith;

However, these drive arrangements tend to be both complex and bulky due to the manner in which the ends of the tapes are captured by a pivotal arm type of arrangement upon insertion of a cartridge into a drive. This bulkiness, while not being significant problem in the above mentioned mass storage systems, wherein the banks of tapes dwarf the tape drive, does however, tend to inhibit their use in personal computing systems. That is to say, these type of arrangements cannot be readily incorporated into the relatively small housings (often referred to as "towers") in which the CPU, hard disc, floppy disc, CD drives etc., are disposed.

Accordingly, there is a need for a highly compact arrangement wherein so called "streamer" types of tape and the like, can be withdrawn from a single reel cartridge and threaded into an operative configuration in the drive, ready for the transfer of large quantities of data.

DISCLOSURE OF THE INVENTION

It is an object of the present invention to provide a coupling arrangement for a single reel cartridge which allows the drive to capture the end of the leader and to draw it into an operative position within the drive.

It is a further object of the invention to provide a coupling arrangement which, in combination with the take up reel in the tape drive, enables the tape to be wound onto the take-up reel without loss of circularity in the tape windings.

It is a further object of the invention to provide a tape cartridge which is provided with a leader and coupling arrangement which enables the tape to be captured using a highly compact arrangement, and thereafter to be tracted into a drive in a manner which threads the tape and prepares it for data recording/uploading.

It is yet another object of the present invention to provide a tape drive which is provided with a leader arrangement which enables the end of a tape which is loaded in a single reel cartridge, to be captured and simply and smoothly drawn into the drive.

In brief, in order to provide a simple and compact tape drive which can capture the end of a tape which is stored in a single reel cartridge and draw it into an operative position within the drive, a take-up coupler is provided at the end of a flexible leader which is connected at its other end to the take-up hub of the tape drive. The take-up coupler is arranged to engage a coupler which is provided either at the end of the tape in the cartridge, or to an end of a flexible leader which interposed between the cartridge coupler and the magnetic tape. Upon insertion of the cartridge, the tape drive induces coupling between the take-up and cartridge couplers and winds the take-up leader onto the take-up hub. This draws the tape along a predetermined path into the drive until it winds onto the take-up hub. The take-up hub is provided with a recess arrangement which allows the interconnected couplers to be snugly received in manner which prevents the circularity of the tape winds from being disturbed.

More specifically, a first aspect of the invention resides in a tape arrangement comprising: a first reel disposed in first housing; a first leader associated with the first reel; a first coupling member provided on an end of the first leader; a second reel, the second reel being disposed in a second housing which is separate from the first housing in which the first reel is disposed; a second leader associated with the second reel; and a second coupling member provided at an end of the second leader, the second coupling member being releasably connectable with the first coupling member so as to permit the rotation of the first reel to wind the first leader back thereon and to drawn the second leader onto the first reel.

This first aspect further includes means for displacing one of the first and second coupling members with respect to the other so that intercoupling between the first and second coupling members takes place. This means can comprise a mechanism which displaces the second housing in a first direction so as to move the second coupling member toward the first coupling member and to induce intercoupling to take place.

In a specific embodiment, one of the first and second coupling member is formed with a post and wherein the other of the first and second coupling members is formed with a bore which receives the post and thus establishes a connection between the first and second coupling members which allows the first coupling member to be pivotal with respect to the second coupling member through a limited angle.

In one embodiment, the displacing means includes means for swinging the first coupling member about an axis which is essentially parallel to the axis of the first reel, and toward the second coupling member, for causing a hooking connection to occur between the first and second coupling members.

In the above arrangement, the first reel is formed with a recess which is so shaped and arranged as to receive the intercoupled first and second coupling members therein in a manner wherein the circular profile of the second reel is not interrupted and to permit the first leader to wind on the second reel without loss of circularity. Further, the first and second coupling members have shapes which are selected so that when intercoupled, the overall shape is smooth and foil-shaped to facilitate the passage from the second housing, via a tape guide structure disposed in the first housing, to the first reel.

In the embodiments of the invention, the second housing comprises a cartridge which has a door hingedly mounted thereon. This cartridge further including lever means which operatively engages cam means provided in the cartridge for opening the door when the cartridge inserted into a predetermined opening formed in the first housing.

A second aspect of the invention resides in a tape arrangement comprising: a cartridge having a first reel rotatably supported therein, the first reel having a length of tape wound thereon; a first connection member; and a first flexible leader, the first leader being attached at a first end thereof to the first connection member and to the tape at a second end thereof, the first connection member being adapted to be releasably connected to a second connection member that is connected at an end of a second flexible leader. This second leader is operatively connected with a second reel and can be wound onto the second reel in a manner to draw the first and second connection members upon intercoupling thereof, to the second reel and to subsequently induce the first leader to also wind onto the second reel.

This second aspect further includes means disposed externally of the cartridge for moving the second connection member with respect to the first one in a manner wherein a male coupling portion, formed on one of the first and second connection members, is engageable in a female coupling portion formed on the other of the first and second coupling members.

This externally disposed moving means is arranged to move one of the first and second coupling members in a direction which is essentially parallel to an axis of rotation of one of the first and second reels. In other arrangements, the externally disposed moving means is arranged to move one of the first and second coupling members in a direction which is essentially normal to an axis of rotation of one of the first and second reels. For example, the externally disposed moving means can pivotally move one of the first and second connection members about an axis which is essentially parallel to an axis of one of the first and second reels.

A third aspect of the this invention resides in a tape arrangement comprising: a take-up hub disposed in a tape drive; a tape-up connector member; a take-up leader, the take-up leader having a first end connected with the take-up hub, and a second end connected to the take-up connector member, the take-up leader being adapted to be wound onto the take-up reel in a manner which draws the connector member back from a connecting position in the tape drive to a position wherein it becomes seated in a recess formed in the periphery of the take-up hub. This arrangement also includes means for moving the connector member into intercoupling engagement with a supply reel connector member which is connected to an end of a supply reel leader which operatively interconnects the supply reel connector member, with a tape wound on supply reel which is rotatably supported in a cartridge that is removably inserted into the tape drive.

This aspect further features guide track means for guiding the take-up connector along a predetermined path which leads from the connecting position to a position proximate the take-up hub. This guiding means cooperates with a pivotal loading arm which is adapted to hold the take-up connector member and to move it along a shunt path which extends from the connecting position to a disconnecting position. The loading arm is operative to maintain the take-up connector in the disconnecting position until a cartridge is inserted into the drive and then move the take-up connector member back along the shunt path to the connecting position wherein engagement between the take-up connector member and the supply reel connector member occurs.

Additional objects, advantages and novel features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF DRAWINGS

The various features and advantages of the present invention will become more clearly appreciated as a detailed description of the embodiments of the present invention is given with reference to the appended figures wherein.

DESCRIPTION OF THE INVENTION

FIGS. 1 to 7, show a first embodiment of the present invention. In this arrangement, a magnetic tape (not shown per se) is wound on a supply reel 101 which is rotatably supported in a cartridge 102. A lead end of the tape is connected to a supply reel coupling element or coupler 104 by way of a flexible cartridge leader 106. In this embodiment, the cartridge leader 106 is made of a material such as mylar for example, and is of a heavier gauge than the tape with which it is connected. The leader 106 is, by way of example, 0.004–0.008 inches thick.

Figure 4:
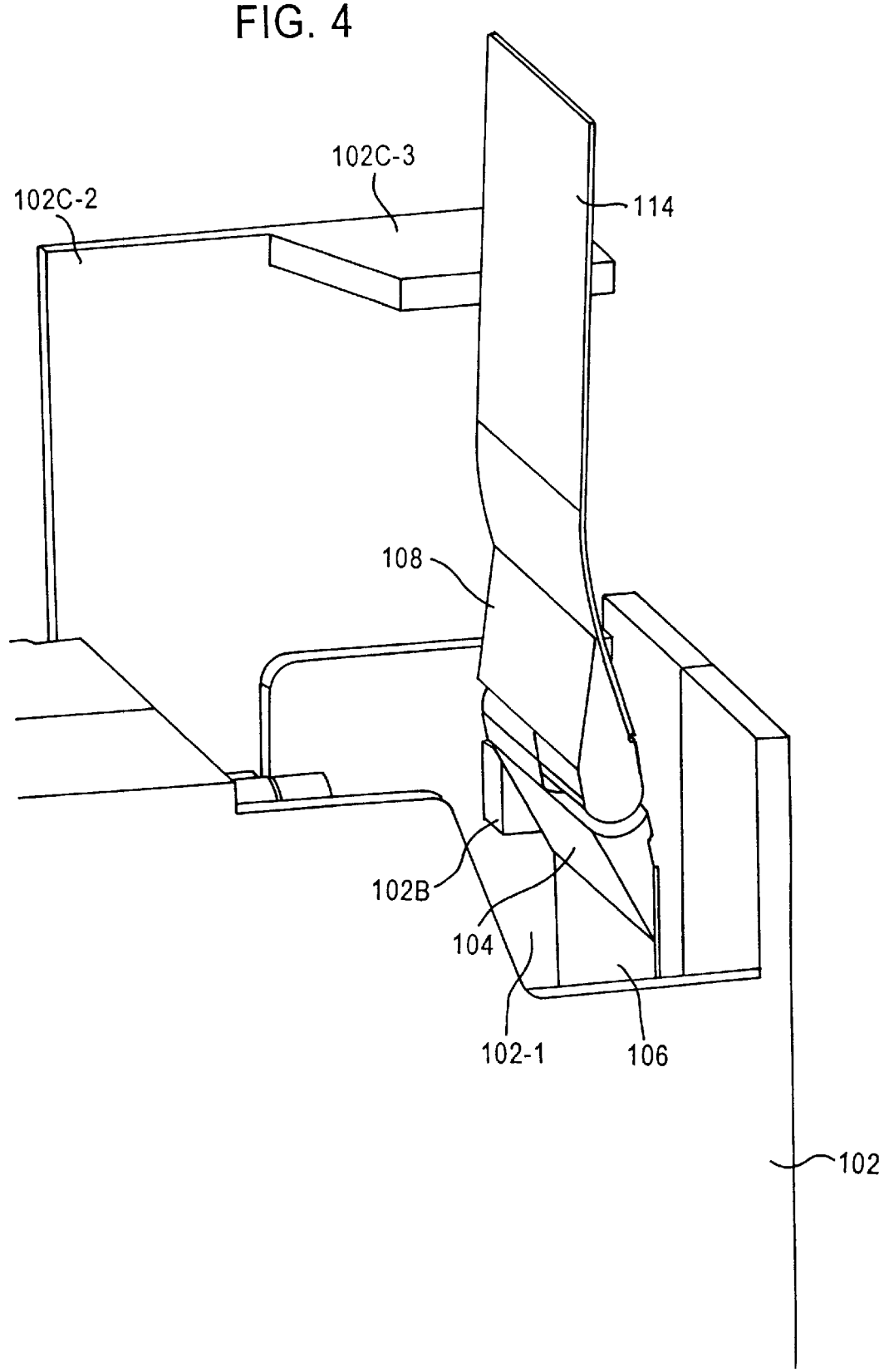
FIG. 4 is a perspective view of the arrangement shown in FIG. 3 as seen from below the cartridge.
Figure 5:
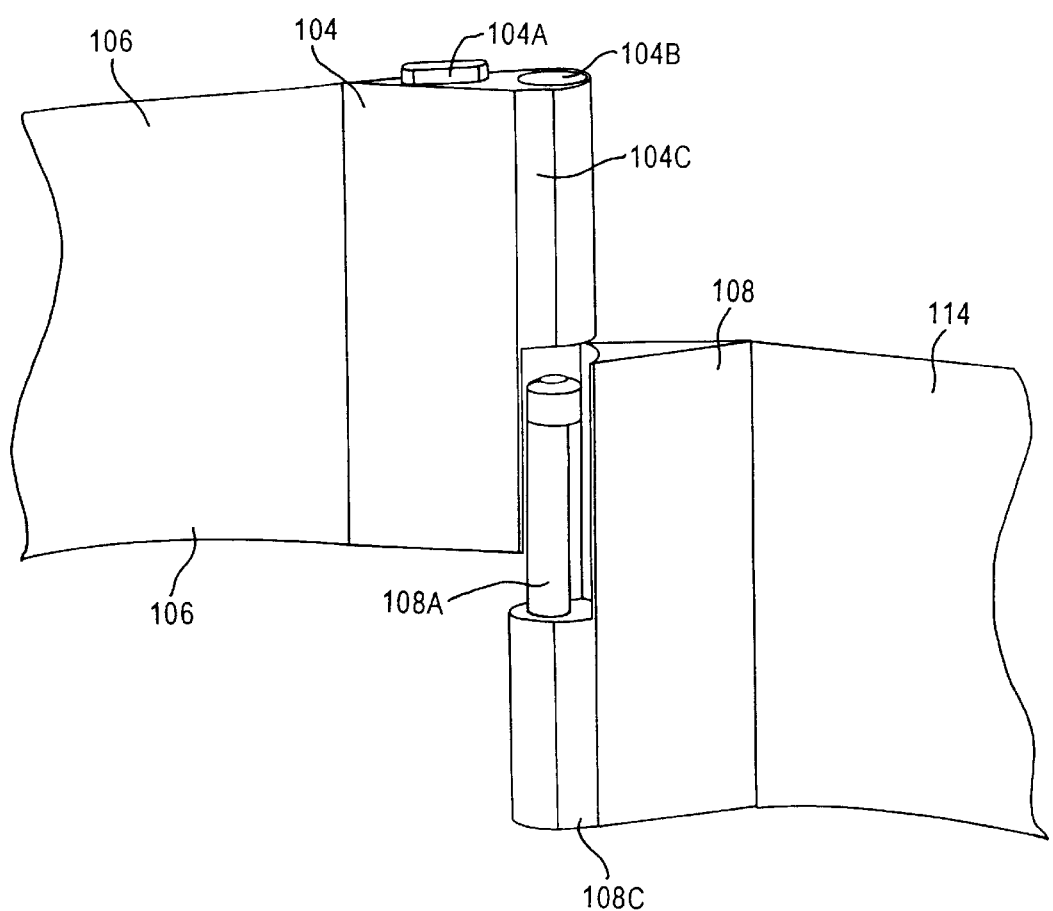
FIG. 5 is a perspective view showing details of the cartridge coupler and the take-up coupler in a vertically separated disconnected state.
Figure 6:
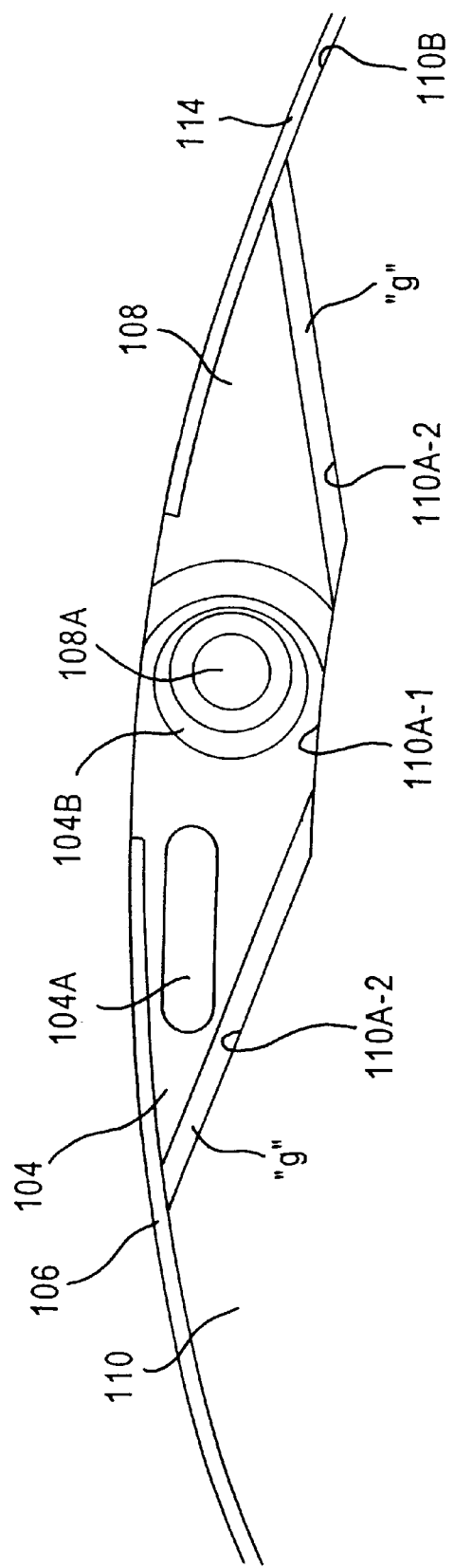
FIG. 6 is a plan view showing the disposition of the intercoupled cartridge and take-up couplers seated in a recess formed in the periphery of the undercut diameter of the take-up reel, in accordance with the first embodiment of the invention.

The coupler 104 at the end of a cartridge leader 106 is made of a rigid material and is, as seen in FIGS. 4–6, arranged to have a narrow foil-shaped cross section as seen in plan view. The cartridge coupler 104 is slightly wider than the cartridge leader 106 which is attached thereto, and is located in a predetermined position at a front corner 102A of the cartridge 102 in the manner shown in FIG. 4, by a locating feature 102B which is incorporated into the cartridge casing 102. The upper surface of the cartridge coupler 104 is, as shown in FIGS. 5 and 6, provided with a guide projection 104A which cooperates with the locating feature 102B and ensures that the cartridge coupler 104 locates in a predetermined position each time the tape is wound back into the cartridge 102. In this case, during storage or non-use periods of the cartridge, the tension in the tape, which is wound on the cartridge or supply reel 101, maintains the cartridge coupler 104 in the position illustrated in FIG. 4.

Figure 1:
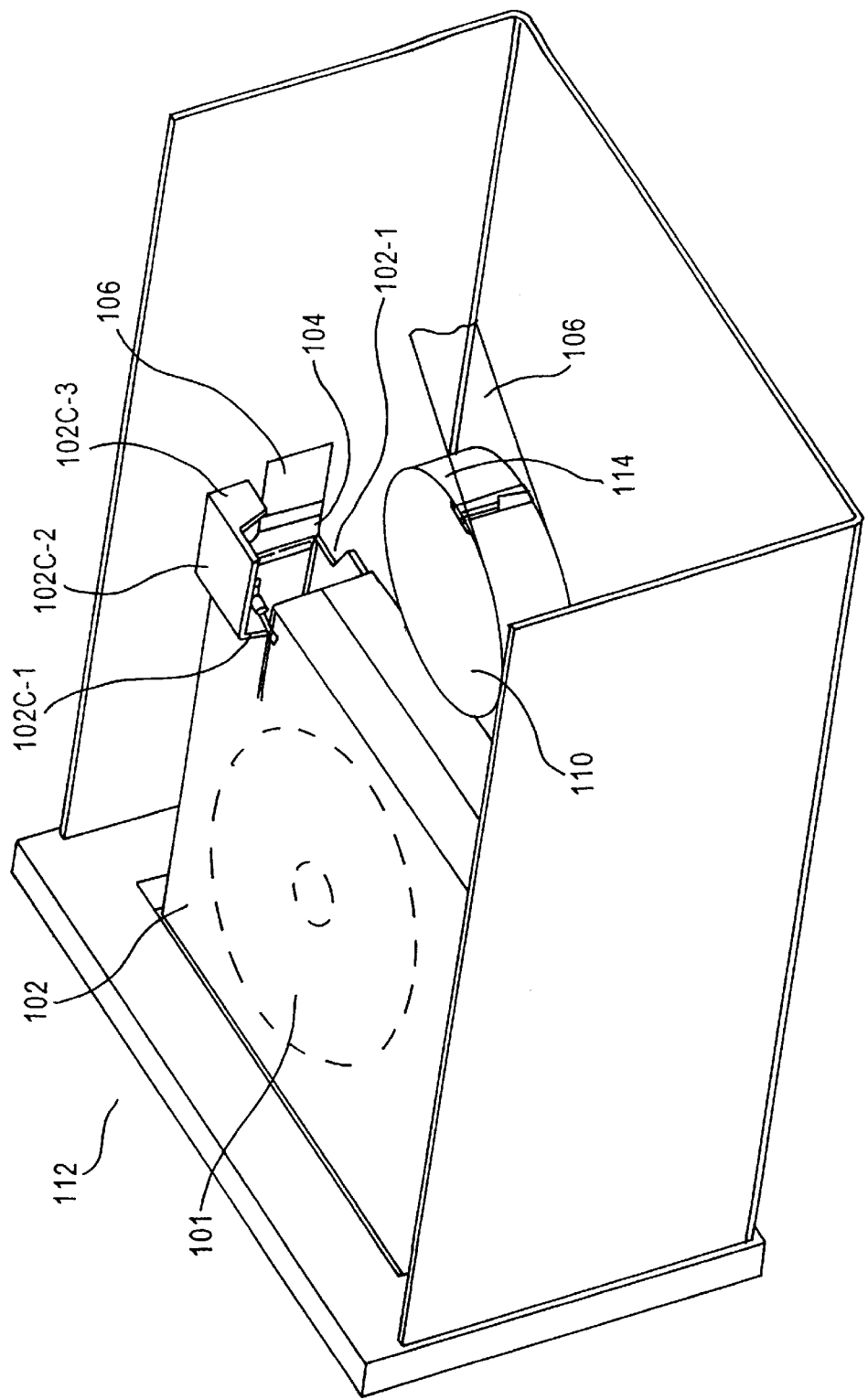
FIG. 1 is a perspective partially cut-away view of a first embodiment of the present invention showing the dispositions of a take-up reel and a cartridge which has been inserted into a drive.
Figure 2:
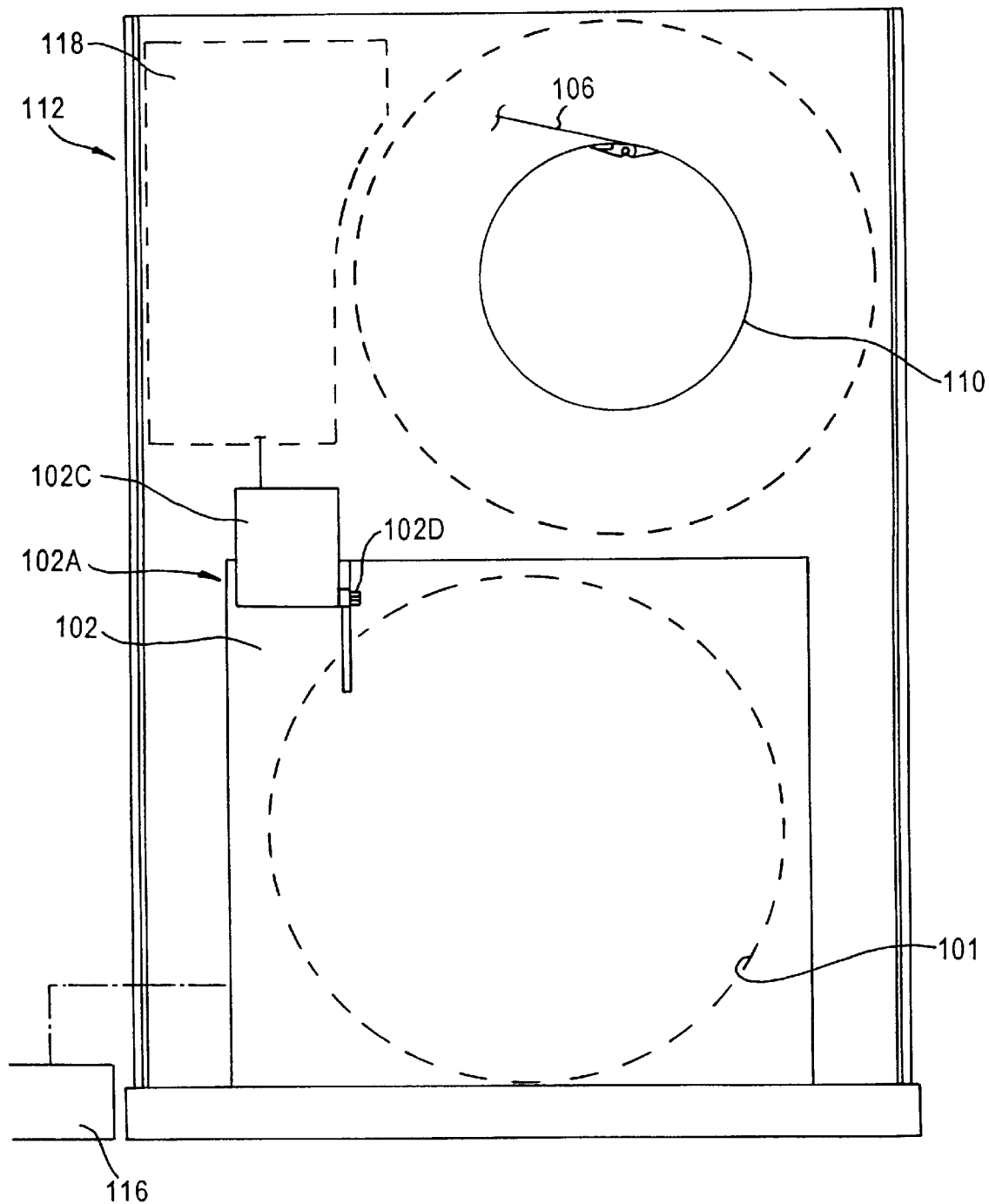
FIG. 2 is a plan view of the arrangement shown in FIG. 1.
Figure 3:
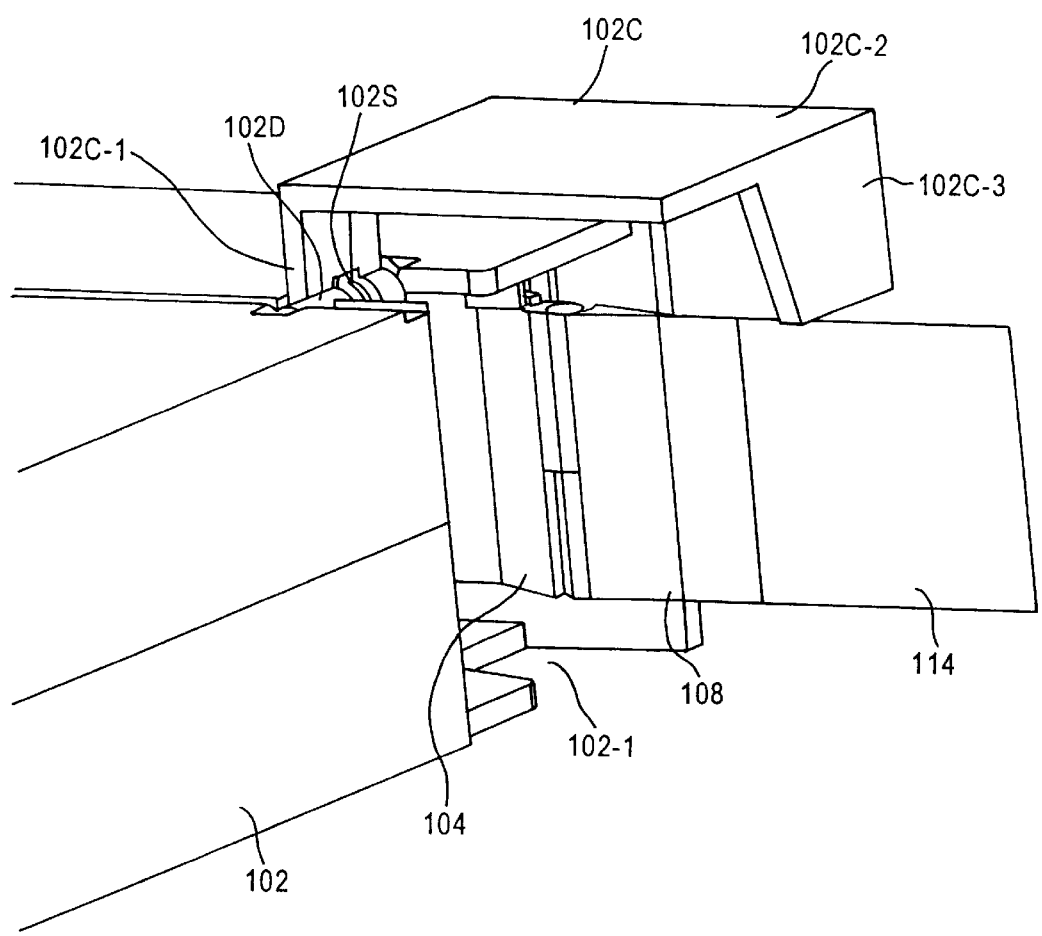
FIG. 3 is a perspective view showing a cartridge with a door thereof in an open position and the cartridge and take-up couplers according to the first embodiment of the invention, intercoupled and conditioned ready to initiate the withdrawal of tape from cartridge.

The corner 102A of the cartridge is closed by a "C-shaped" door 102C which is pivotally mounted on the cartridge by way of a pin 102D, and is normally biased to a closed position by a torsion spring 102S (see FIG. 3). As best seen in FIGS. 1–4, this C-shaped door 102C has an upper wall portion 102C-1, an edge wall portion 102C-2, and a tongue 102C-3 which extends back from the edge wall so as to be essentially parallel with the upper wall 102C-1.

When the door 102C is moved to an open position, such as illustrated in FIGS. 1–4, the recess 102-1 in the cartridge casing which receives the tongue 102C-3 when the door 102C is closed, exposes the lower edge of the cartridge coupler 104 in the manner shown in FIG. 4. This permits a tape drive or take-up coupler 108, to move vertically with respect to the cartridge coupler 104 and operatively engage therewith.

In this embodiment the take-up coupler or link 108 is provided with a headed pin 108A (male connection member) (see FIG. 5) which can slide into a bore 104B formed in the cartridge coupler 104 and establish a pivotal hinge-like connection between the two coupling members 104, 108. As will be appreciated from FIG. 6, the diameter of the bore 104B, which is formed in the cartridge coupler 104, is larger than that of the pin 108A, thus allowing for some positional inaccuracies between the two couplers as they approach one another and hence facilitate engagement therebetween. The oversizing of the bore 104B also allows for some amount of relative movement between the couplers and facilitates the negotiation of corners and curves encountered along the path followed during loading and unloading of the tape.

As shown in FIGS. 4 to 6, the take-up coupler 108 has a narrow foil-shape which is similar to that of the cartridge coupler 104. This shape further facilitates the movement of the intercoupled cartridge and take-up couplers 104, 108 from the point of connection, established in the manner illustrated in FIG. 4, along a path (not shown) wherein the tape, which is attached to the inboard end of the cartridge leader 106, is tracted into a operative threaded condition wherein recording/playback is possible.

The take-up coupler 108 is connected with a take-up hub 110 which forms part of the tape drive 112, by way of a flexible take-up leader 114. This leader 114 can be made of the same material as that of the cartridge leader 106 and have essentially the same width dimensions.

Figure 7:
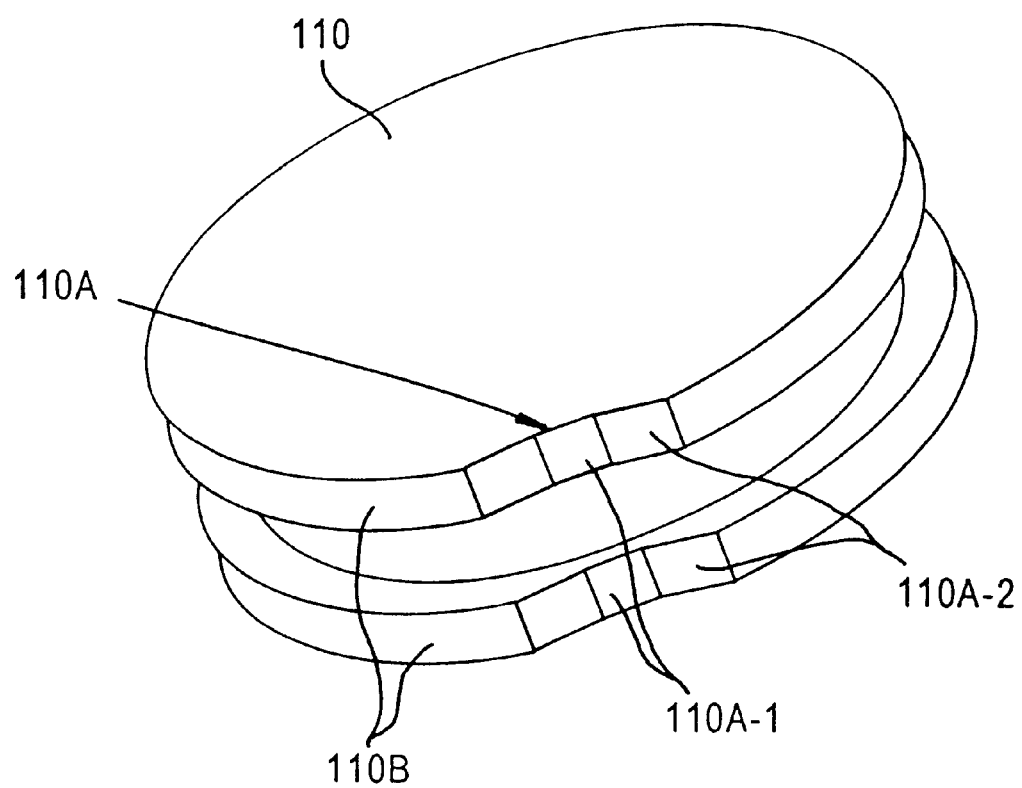
FIG. 7 is a perspective view showing the recess in the take-up reel which is used to receive the coupled cartridge and take-up couplers in the manner depicted in FIG. 6.

The take-up reel or hub 110 is provided with coupler seat in the form of a pair of shaped recesses 110A which are formed in its outer diameter periphery 110B in the manner illustrated in FIG. 7. The shape of the recesses 110A is selected to correspond essentially to that of the intercoupled cartridge and take-up couplers 104, 108, so that, as shown in FIG. 6, the two members may seat in the recesses 110A. In this position, the two flexible leaders 106, 114 wrap around the outer diameter 110B smoothly and without the formation of an undulation which will reduce the circularity of the windings of the tape during operation of the tape drive 112.

In this arrangement, the recesses 110A are each provided with a curved surface portion 110A-1. This curved surface portion 110A-1, as shown in FIG. 6, mates with a curved surface which is established on one side of the combined cartridge and take-up couplers 104, 108, as a result of the provision of two curved surface portions 104C, 108C (see FIG. 5) formed on the inboard sides of the respective couplers.

The sides 110A-2 of the recesses 110A on either side of the curved surfaces 110A-1, are arranged to permit the formation of gaps "g" between the inboard surfaces of the two couplers 104, 108 and allow the pivotal movement, which is possible between the two couplers 104, 108, due to the diameter differential between the bore 104B and the headed pin 108A, to ensure that the exterior surface of couplers 104, 108 complements that of the remainder of the outer diameter 110B of the take-up hub 110, and ensures an adequate circularity of the tape windings during operation.

In this embodiment, in order to achieve the coupling between the cartridge and take-up couplers 104, 108, the tape drive 112 is provided with a cartridge manipulation means which is generally denoted by the numeral 116 and schematically indicated in box diagram form. This manipulation means 116 is such that, after the cartridge has been inserted into the drive 112, it induces the opening of the cartridge door 102C, either partially or wholly, and the lowering the cartridge 102. This vertically displaces the cartridge within the tape drive 112 in a manner wherein intercoupling of the cartridge coupler 104 and the take-up coupler 108, can be achieved. In this embodiment, inserting the cartridge part way into the drive causes the cartridge door to be partially opened by a cam bar (not show) located in the tape drive 112. As the cartridge is further inserted into the drive, the door 102C is further opened by a ramp which lifts the lower edge of cartridge door. At full insertion the cartridge door 102C is held approximately half way open, as the cartridge is lowered to achieve intercoupling between the cartridge coupler 104 and the take-up coupler 108, the door 102C is opened to a full 90° during the downward movement.

Mechanisms for lowering tapes, floppy discs and CD's into operative positions are very well known in the art of recording and reproducing apparatus. Accordingly, a detailed description of such mechanisms/arrangements is omitted for the sake of brevity. Discussion of a mechanism for opening the cartridge door 102C will be given hereinafter with reference to the second embodiment of this invention.

It is of course possible to achieve the relative movement between the two couplers 104, 108 without lowering the cartridge, however, as this technique is widely used, it is convenient to make use of this well developed technology. Other means for achieving the intercoupling of the two couplers 104, 108 could take the form of raising and lowering the take-up coupler 108 on a pivotal arm and making provision for the leader to be carried at least in part by a guide pin or roller which is mounted on a suitable position on the arm.

The operation of the above described arrangement is such that, when the cartridge is inserted into the tape drive 112, the above mentioned cartridge manipulation means 116 opens the cartridge door 102 exposing the lower face of the cartridge coupler 104. At this time, the cartridge is located in a predetermined position within the drive so that, with the cartridge coupler 104 located in the cartridge by the cooperation of the cartridge coupler guide projection 104A and the cartridge coupler locating feature 102B, the lowering of the cartridge 102 as a whole, will lower the cartridge coupler 104 onto the take-up coupler 108. As the two couplers come together, the headed pin 108A slides into the bore 104B formed in the cartridge coupler 104, which has been located in a loading position at the end of a guide track (not shown) which is included in a head/actuator tape guide section 118.

After the cartridge coupler 104 and the take-up coupler 108 have been intercoupled, motors (not shown) associated with the cartridge (supply) reel 101 and the take-up hub 110, induces the take-up hub to rotate in a direction which winds in the take-up leader 114. It will, of course, be appreciated that the length of the take-up leader must be carefully selected so that the on-winding of the leader 114 will cause the take-up coupler 108 to seat in the coupler seat recesses 110A.

As the intercoupled connectors 104, 108 are drawn toward the take-up hub, they pass along a path which threads the tape, connected to the end of the cartridge leader 106, into an operative play/record position within the tape drive 112. Upon reaching the coupler seat, the intercoupled cartridge and take-up couplers 104, 108 are received in the coupler seat and assume the condition which is shown in FIG. 6. The cartridge leader then winds around the take-up hub, pulling the magnetic tape into a fully operational position in the cartridge drive.

When the use of the tape is no longer required, the process is reversed and the motors wind the tape back into the cartridge 102. When the intercoupled couplers reach the position wherein the cartridge coupler 104 engages the cartridge coupler locating feature 102B, the cartridge is lifted and the interconnection between the two couplers 104, 108 is dissolved with the headed pin 108A being extracted from the bore 104A in the cartridge coupler.

Second Embodiment

FIGS. 8–20 show a second embodiment of the invention. This embodiment is essentially similar to the first and basically differs in that the connection between the cartridge coupler and the take-up coupler is achieved by lateral swinging movement (lateral displacement) as different from the vertical displacement achieved by raising and lowering the cartridge within the drive. It should however, be noted that the cartridge can be raised and lowered within the drive as desired, but this vertical displacement is, in accordance with this second embodiment, not essential to the coupling/ uncoupling of the two couplers or links.

Figure 8:
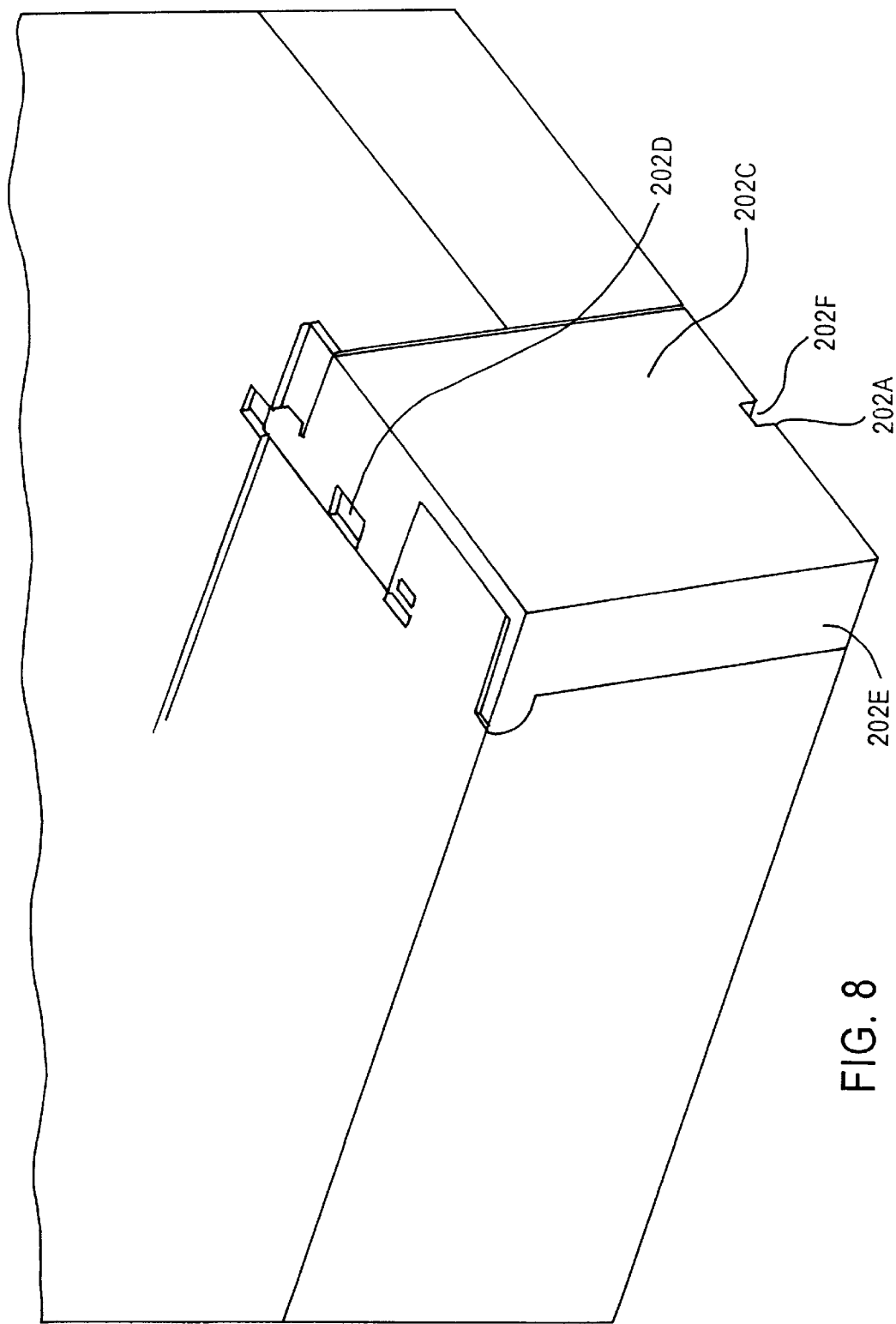
FIG. 8 is a perspective view of cartridge and its associated door which is used in connection with a second embodiment of the invention.

FIG. 8 shows in perspective, a front corner 202A of cartridge 202 in which a door 202C which is pivotally connected with the main body of the cartridge 202 by a pin 202D. This door is biased by a spring (not shown) to normally assume a closed position, and is formed to have a side edge wall portion 202E which, when the door 202C is opened is sized to expose a lateral side of the coupler disposed therein.

Figure 9:
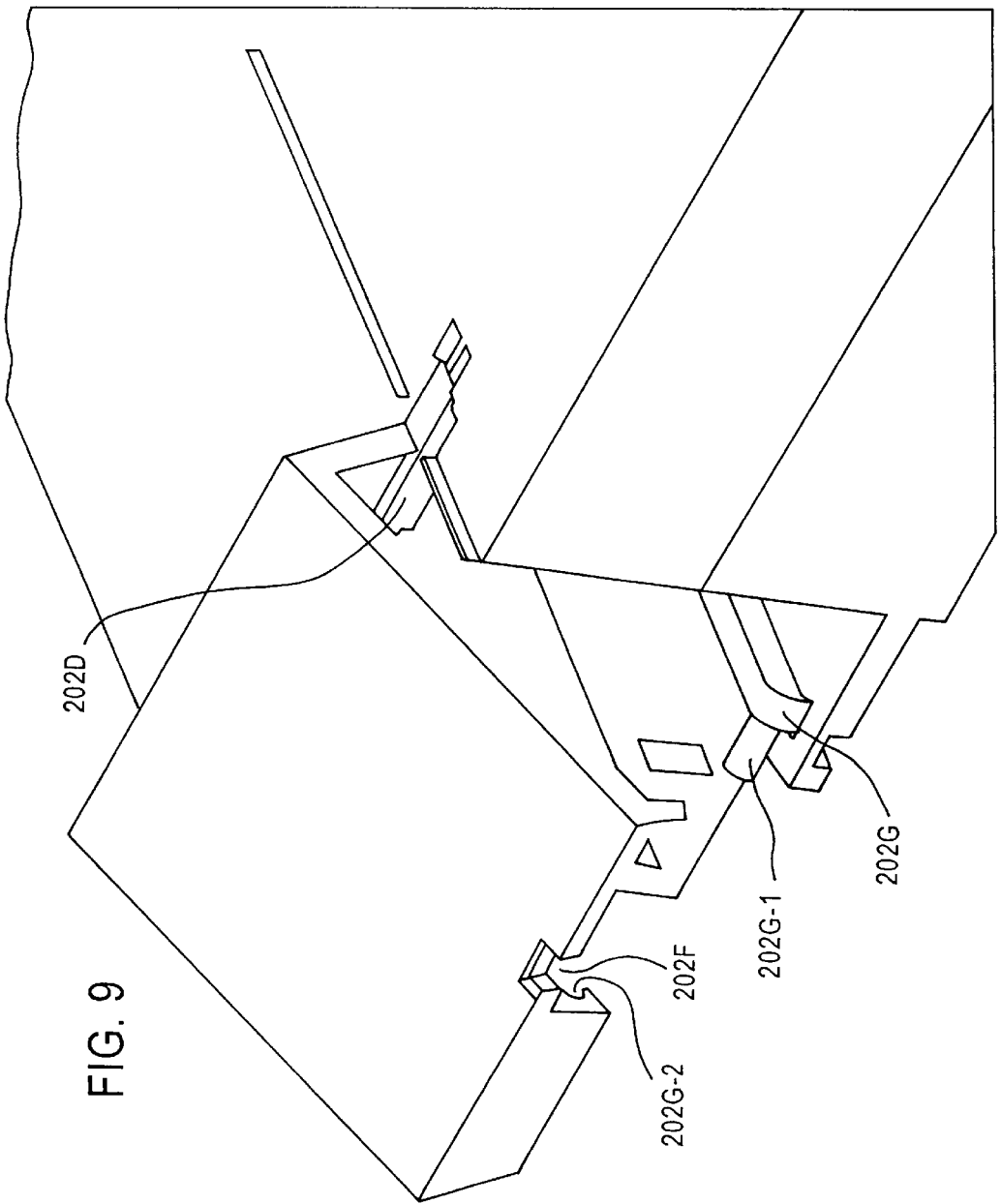
FIG. 9 is a perspective view of the cartridge shown in FIG. 8, wherein the door has been released and has been partially opened.

A front lower edge of the door 202C is provided with a recess 202F into which a release feature (not shown) can be inserted when the cartridge 202 is inserted into an operative position in a tape drive. This release feature engages a door release lever 202G which is, as shown in FIG. 9, pivotally mounted with the cartridge and arranged to extend toward the rear side of the door in the manner illustrated in FIG. 9. In this particular embodiment, the lever 202G is provided with a pin 202G-1 which engages in a recess 202G-2 formed along the rear lower edge of the door 202. When the lever 202G is lifted by engagement with the release feature the pin 202G-1 is lifted out of the recess 202G-2 and the door 202C is unlocked and ready to be lifted to an open position. The sequential partial/full opening of this door can be accomplished in the same manner as set forth above in connection with the door 102C of the first embodiment.

Figure 10:
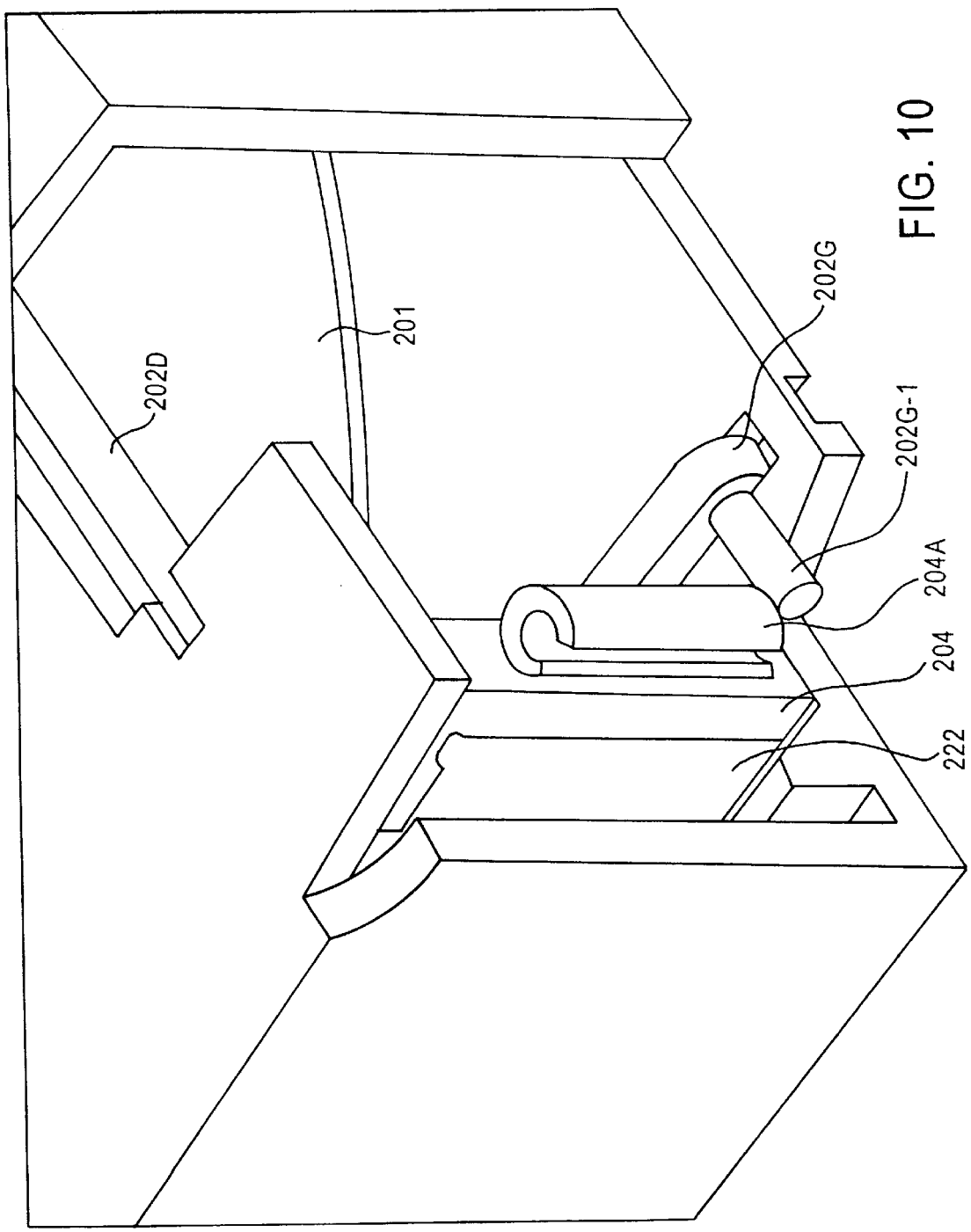
FIG. 10 is a perspective view of the cartridge shown in FIGS. 8 and 9, with the door removed revealing details of part of a door release mechanism and depicting the cartridge coupler positioned ready for engagement with a take-up coupler associated with a tape drive arrangement.
Figure 15:
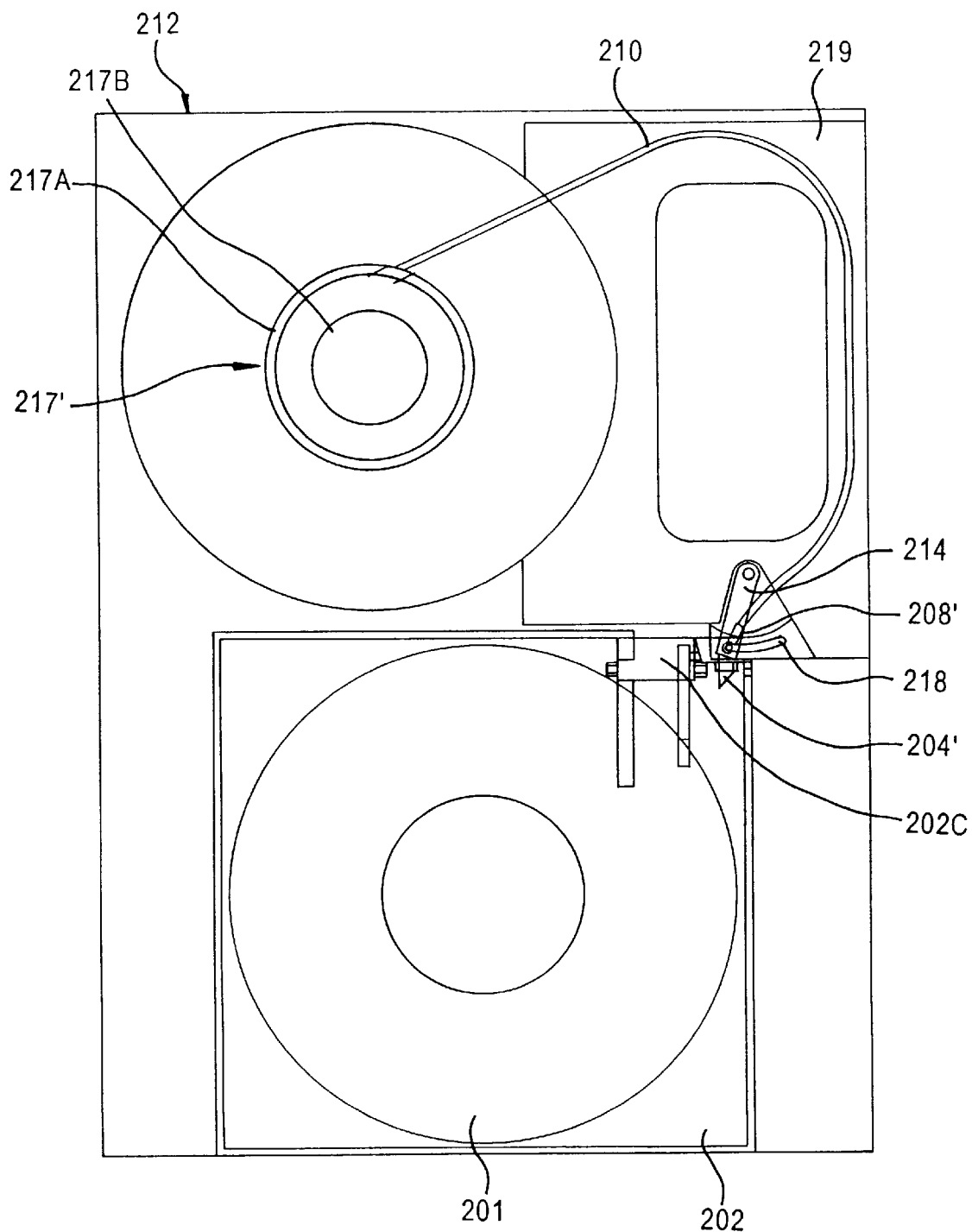
FIG. 15 is a plan view showing the relationship between a guide track, an associated take-up reel and a cartridge.

FIG. 10 shows the cartridge with the door 202C removed for ease of understanding of the structure which characterizes this embodiment. The edge of the supply reel 201 is visible through this opening. Further, as will be noted, the cartridge coupler or link 204 in this instance is formed with a curved clip-like hook member 204A at its leading edge. This clip-like hook member 204A is arranged to have its open portion facing toward the side of the cartridge in readiness to capture a shaft 208A which forms part of the take-up coupler or link 208. In this embodiment, the shaft 208A has portions (best seen in FIG. 13) which project above and below the upper and lower edges of the coupler 208 so as to act as guide pins 208A-1. These guide pins 208A-1 follow link guide tracks 210 which, as shown in FIG. 15, is provided in link guide tracks 219 (only one is shown) which forms part of the tape drive 212.

Figure 16:
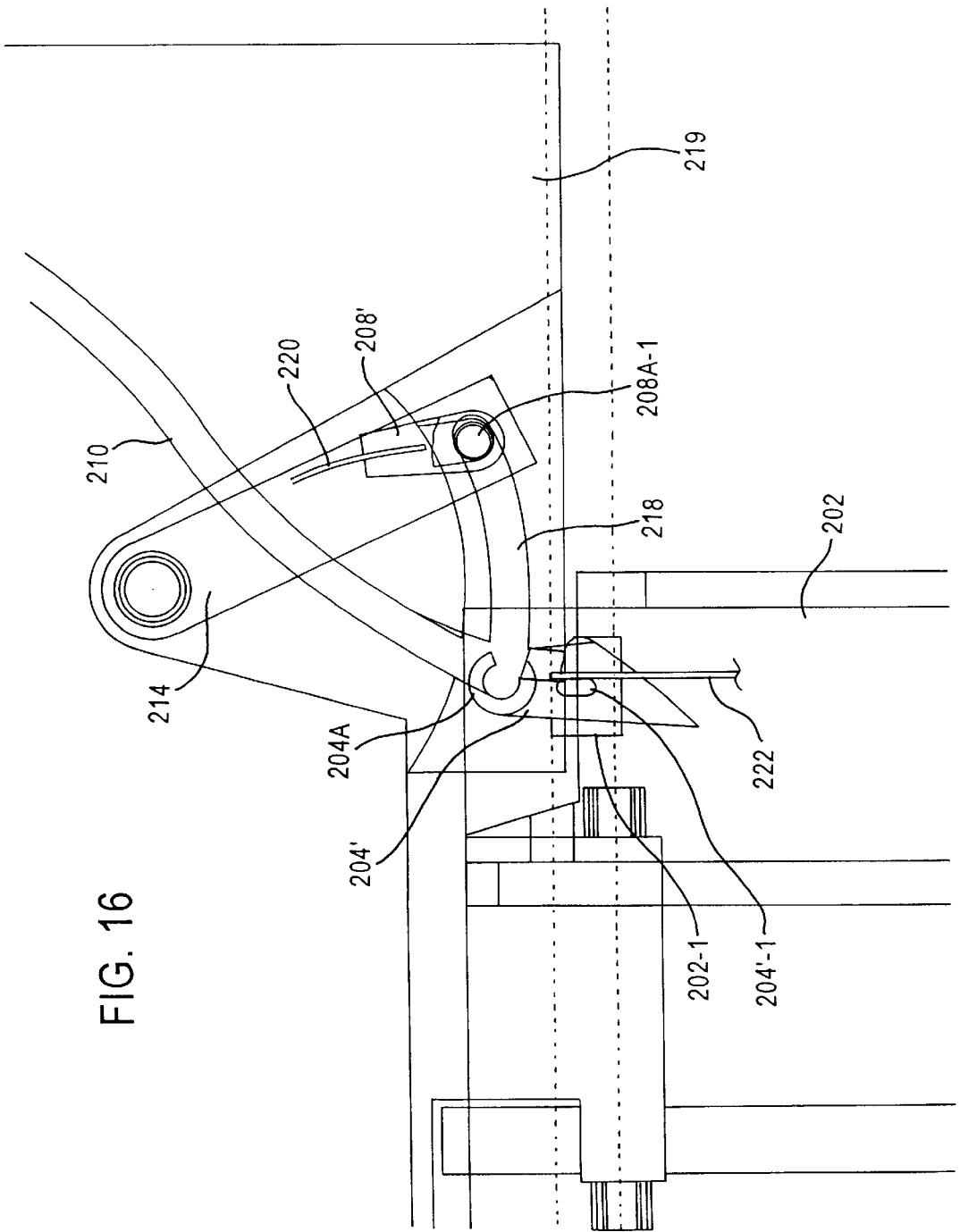
FIG. 16 is a plan view of a mechanism which is used to induce engagement between the cartridge and take-up links in accordance with the second embodiment of the invention, with a take-up link load arm swung to a disengaging position.
Figure 17:
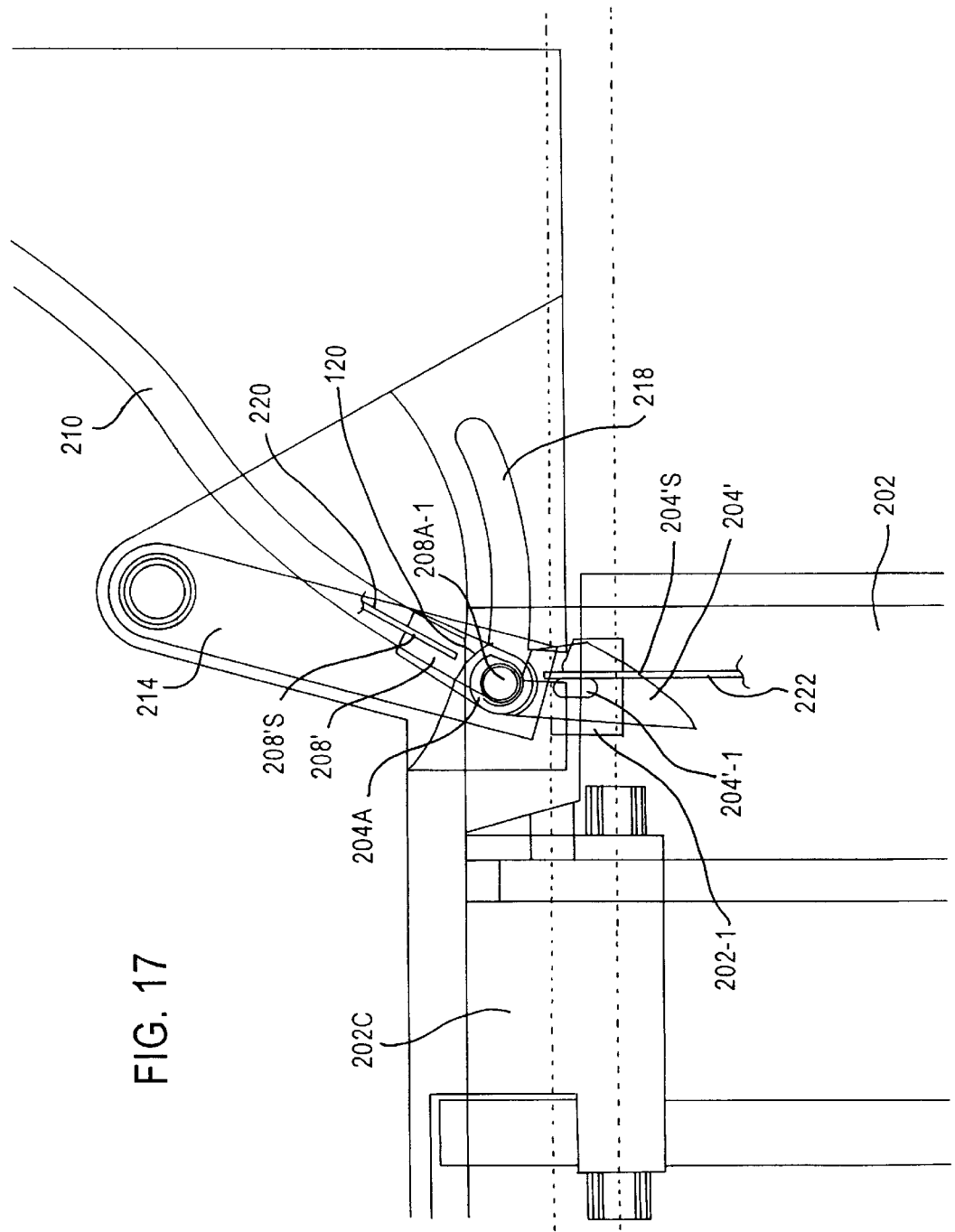
FIG. 17 is a plan view similar to that shown in FIG. 16, showing the take-up link load arm swung to a position wherein engagement between the cartridge and take-up links are established.

In this embodiment, lateral movement of the take-up coupler or link 208 is controlled by a link load arm 214. This link load arm 214 is, as shown in FIGS. 16 and 17, pivotal between a disconnect position (FIG. 16), and a connect position (FIGS. 15 and 17), under the control of load motor mechanism (not shown). In this arrangement, the link guide track 210 is arranged to lead the take-up coupler 208 back from the position wherein it has intercoupled with the cartridge coupler 204', to a take-up hub 217. A loading guide track 218 is also formed in the link guide plate 219 and arranged to receive the guide pins 208A-1, and to shunt the take-up coupler 208 between the above mentioned connect and disconnect positions during pivotal movement of the link load arm 214.

Figure 11:
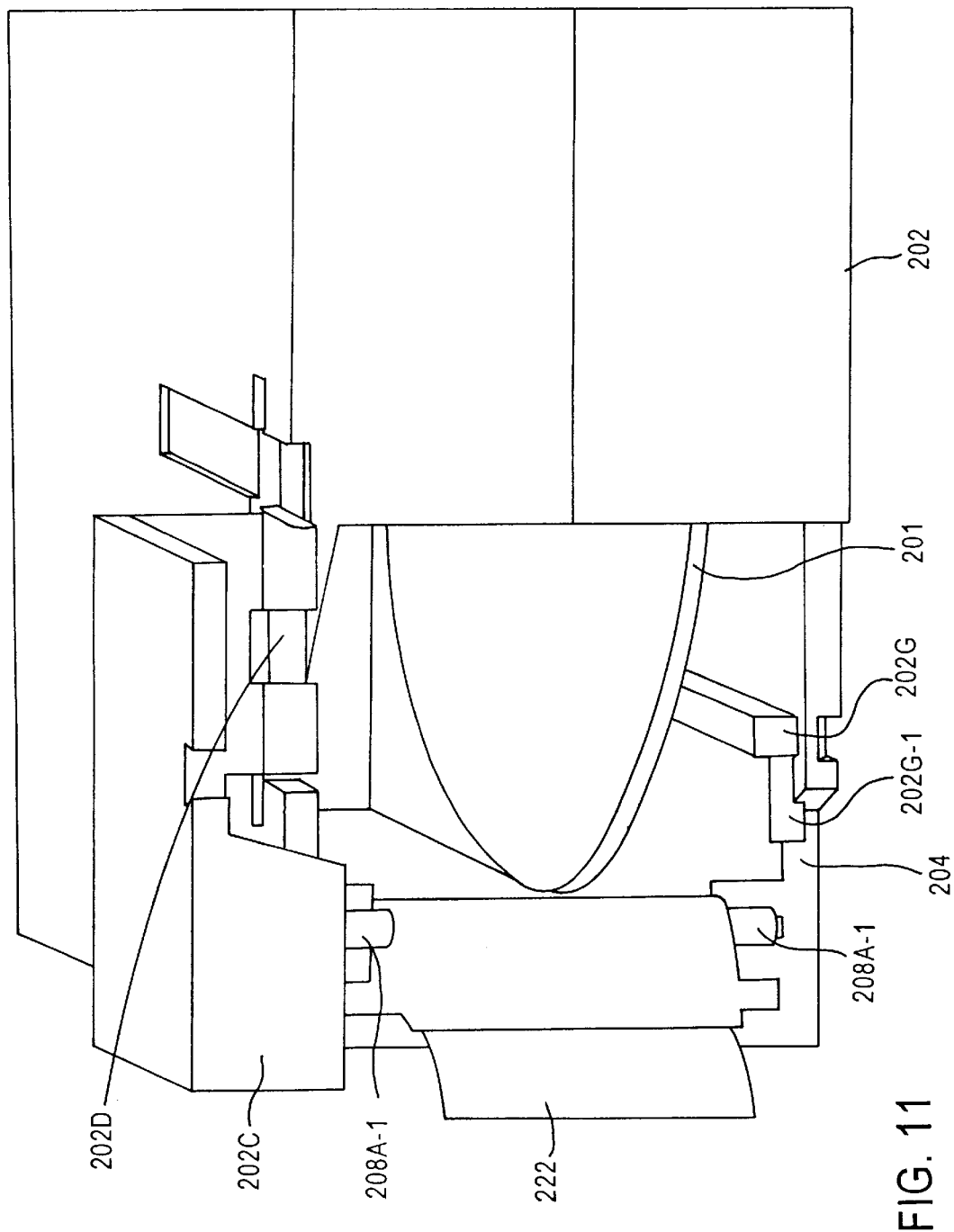
FIG. 11 is a perspective view of the cartridge shown in FIG. 10 showing the position the door assumes in readiness and with the cartridge coupler coupled with a take-up coupler according to the second embodiment.
Figure 12:
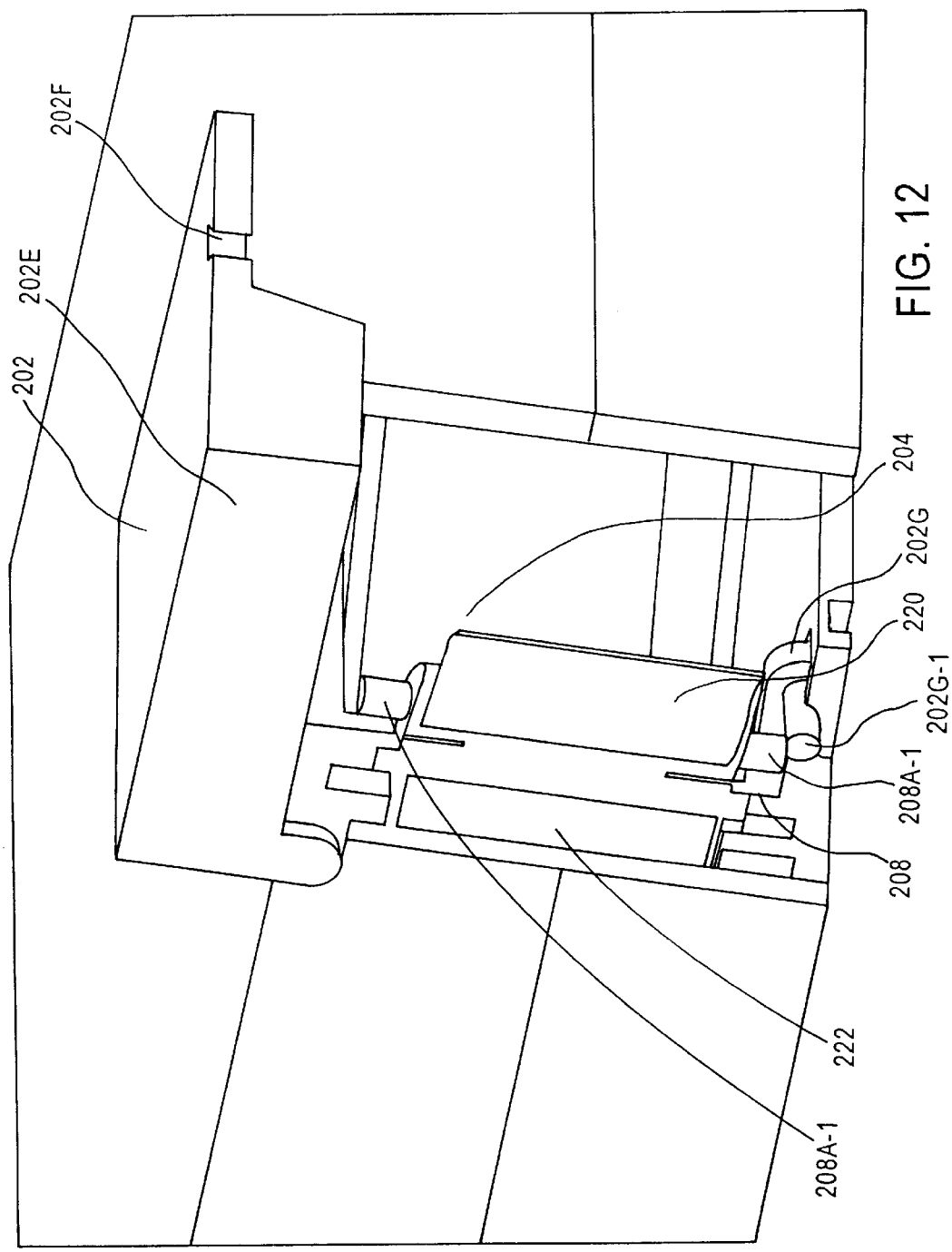
FIG. 12 is a perspective view of the arrangement depicted in FIG. 11 as taken from a different angle.
Figure 13:
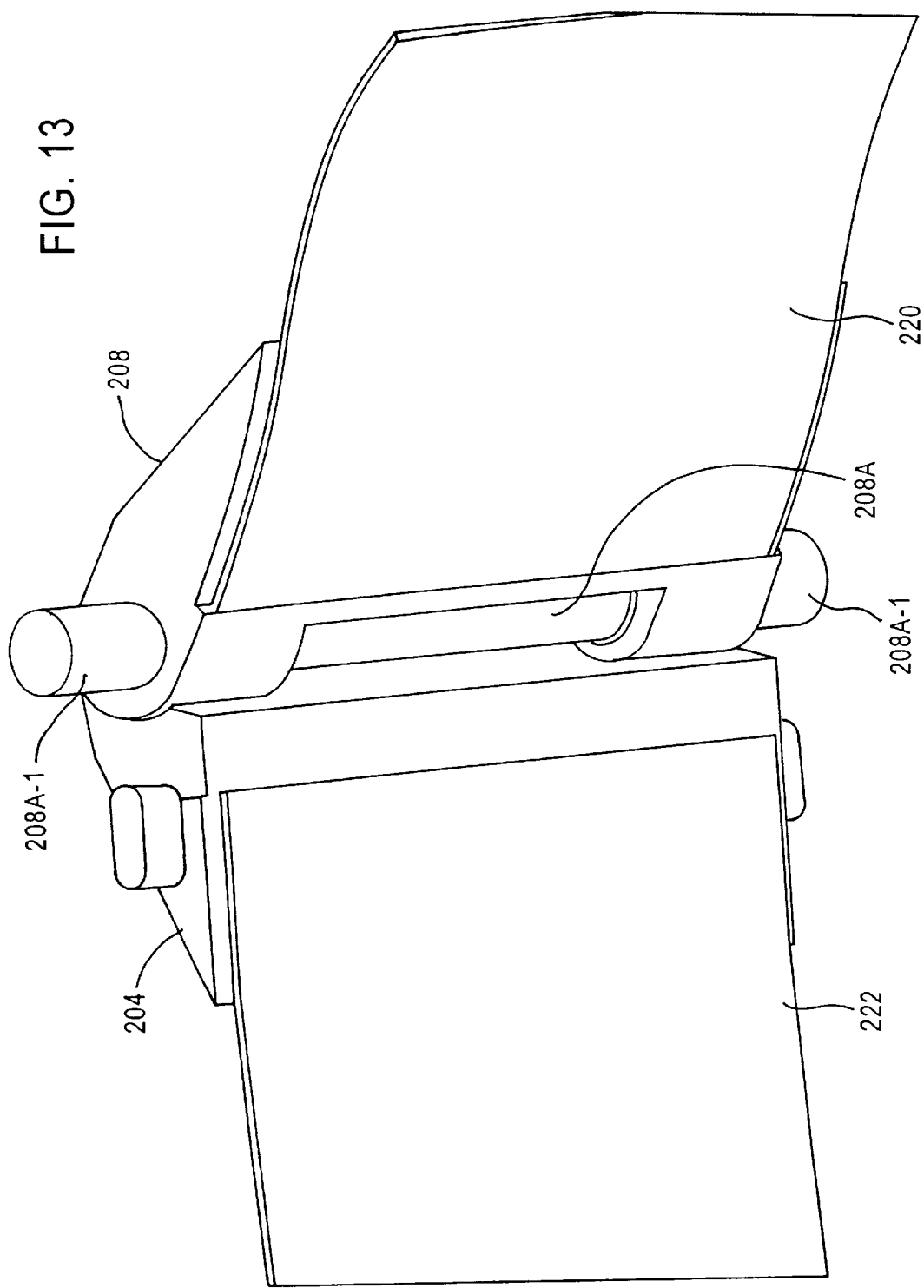
FIG. 13 is a perspective view depicting the engagement between the cartridge and take-up couplers and which shows the use of a bar which forms part of one of the couplers extending above and below the main body of the coupler so as to act as a guide track followers.
Figure 14:
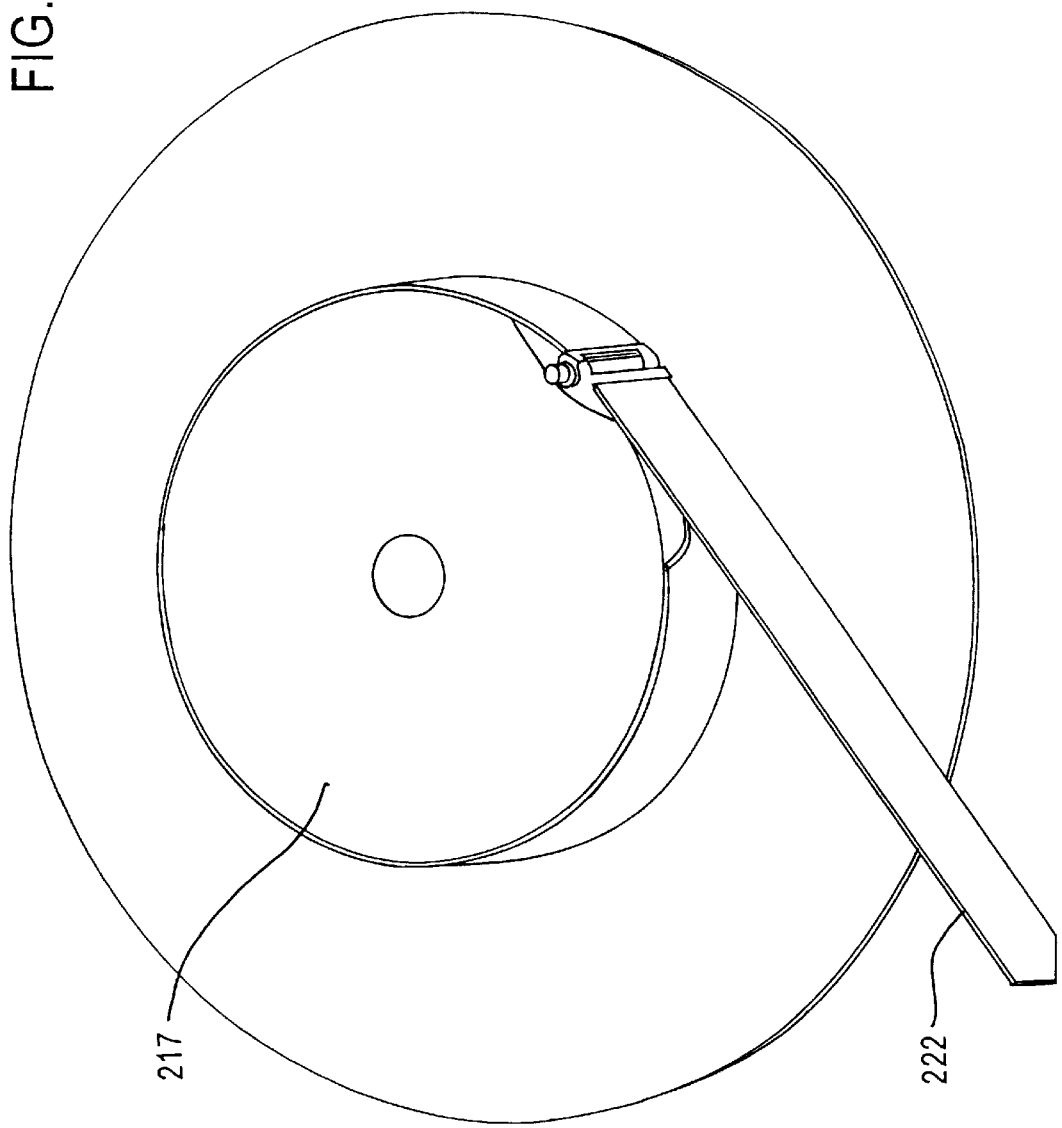
FIG. 14 is a perspective view of a partially disassembled take-up reel showing the provision of a recess and the manner in which the intercoupled cartridge and take-up couplers are received therein in a manner similar to that shown in FIG. 6.

It will be noted that the cartridge coupler 204 and the take-up coupler 208, which are shown in FIGS. 11, 12 and 13, for example, are slightly different in construction and arrangement from those (204', 208') shown in FIGS. 15 to 20. The variants which are shown in FIGS. 11–13, are adapted to cooperate with a take-up hub 217 of the nature shown in FIG. 14, wherein the intercoupled couplers 204, 208 are arranged to become seated in a recess shown in FIG. 14. This arrangement is essentially similar to the arrangement of the first embodiment depicted in FIG. 6. The variants shown in FIGS. 15 to 20, on the other hand, are arranged to cooperate with a take-up hub 217 of the type shown in FIGS. 15 and 20.

In this latter type of arrangement, the take-up leader 220 is arranged to be drawn into the interior of the take-up hub 217' which is comprised of an outer hub member 217A and an inner hub member 217B. The inner hub member 217B is operatively connected with a motor while the outer hub member 217A is arranged to be rotatable about the inner one. When the inner hub 217B is driven to rotate, the take-up leader 220 is wound onto the inner hub 217B. Upon the intercoupled couplers 204', 208' being tracted into a recess formed in the hub members, the two hub members become locked together and the cartridge leader 222 is induce to wind onto the exterior of the outer hub member 217A as it rotates in synchronism with the outer one 217B.

Figure 18:
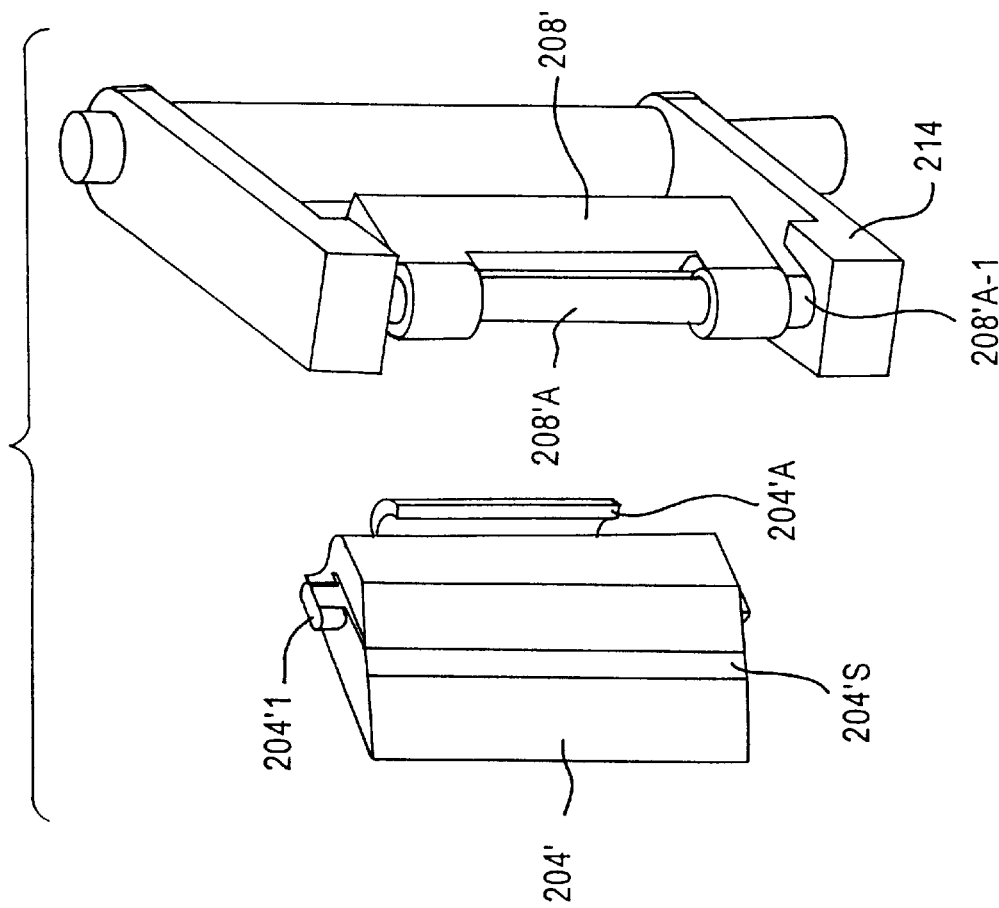
FIG. 18 is a perspective view showing the take-up link supported in the take-up link load arm ready to be swung into an engagement with the cartridge link.
Figure 19:
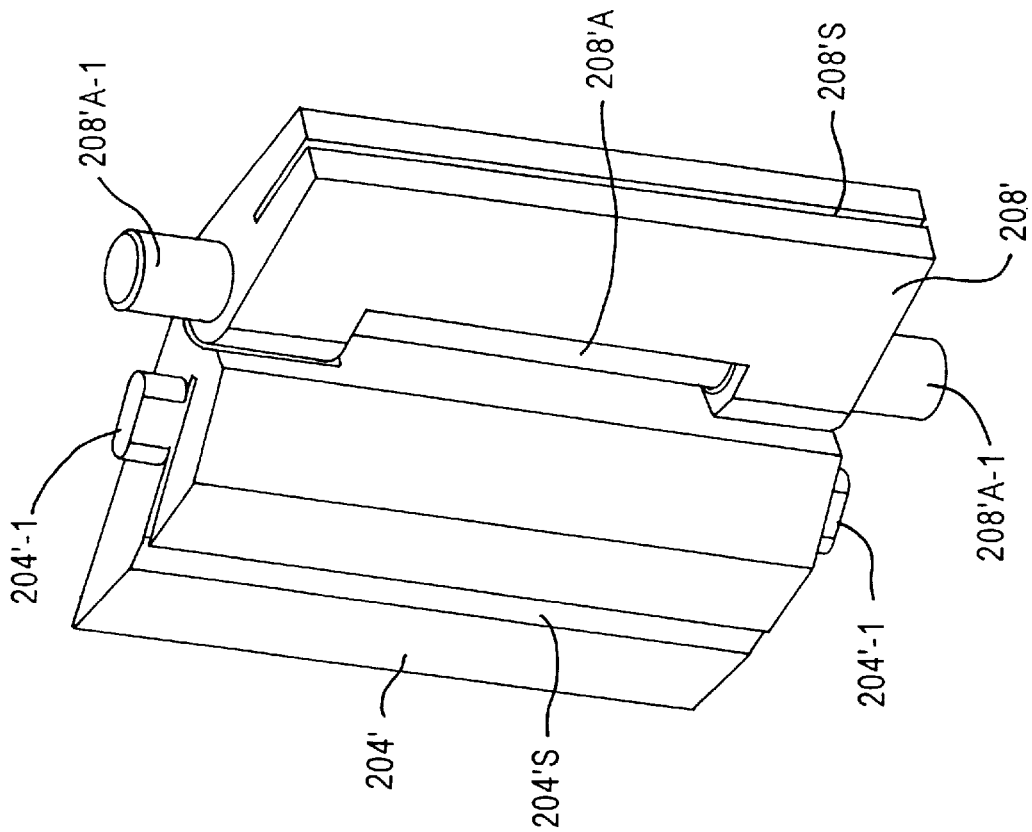
FIG. 19 is a perspective view showing the cartridge and take-up links according to the second embodiment of the invention in a fully engaged state.
Figure 20:
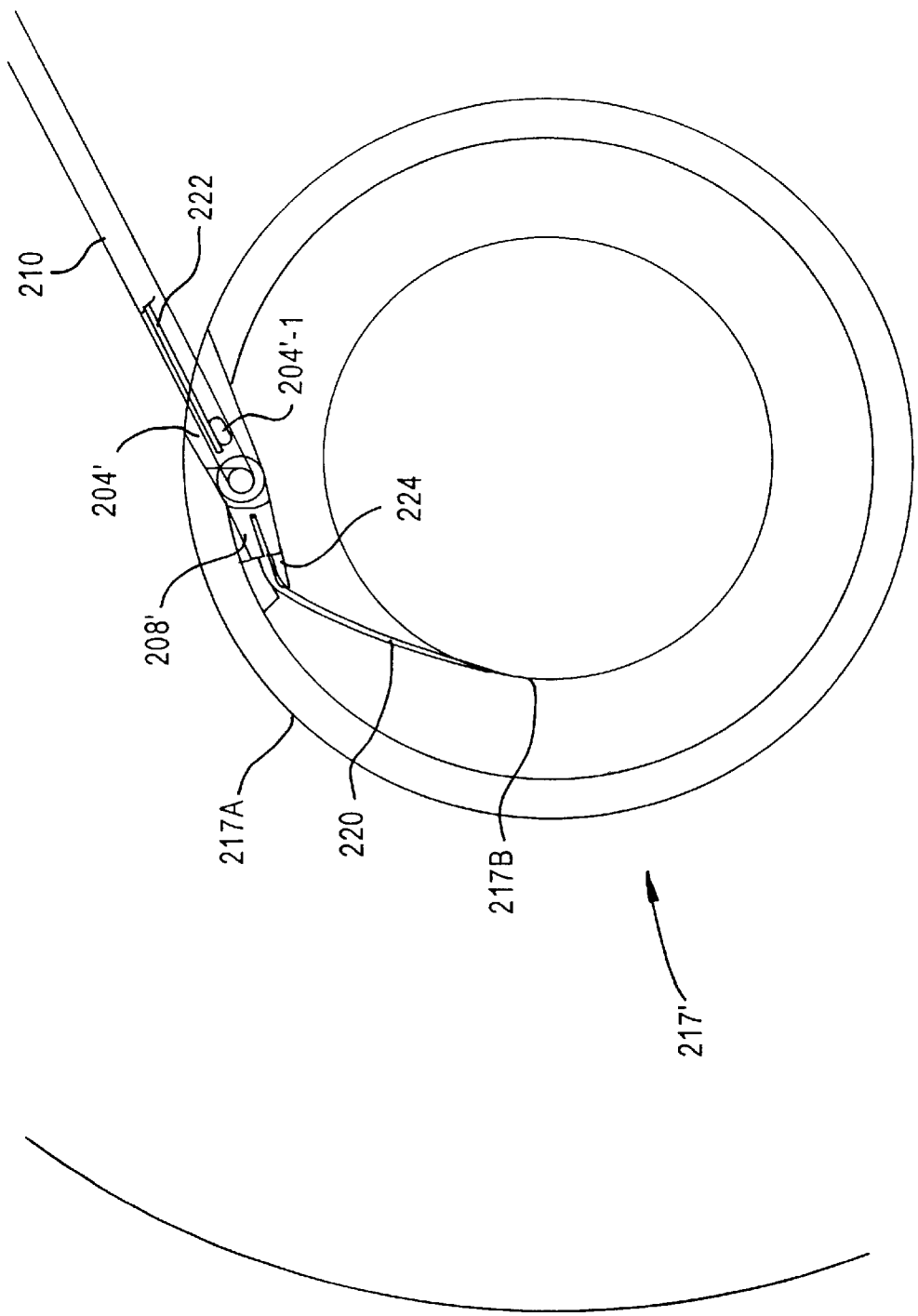
FIG. 20 is a plan view showing the interconnected take-up and cartridge links tracked into a operative position in a recess formed in the take-up reel in accordance with a variant of the second embodiment of the invention.

FIG. 18 which shows only the cartridge coupler 204', the take-up coupler 208' and the link load arm 214, and demonstrates how the link load arm engages the guide pins 208A-1 which project above and below the take-up coupler 208 and holds the take-up coupler 208' in the spaced relationship with respect to the cartridge coupler 204' in readiness for coupling or interlining therewith. FIG. 19 shows the two couplers 204', 208' after linking has taken place.

The slots 204'S and 208'S which are respectively formed in the cartridge and the take-up coupler 204' and 208', for receiving the respective cartridge and take-up leaders 222, 220 are clearly shown in FIGS. 18 and 19.

The operation of this second embodiment is such that when the cartridge 202 is loaded, the door is released and cammed to a fully open position. The situation at this time is essentially as shown in FIG. 16, wherein the link load arm 214 is in the disconnect position. A load motor or the like type of mechanism is then used to swing the link load arm 214 to the position shown in FIG. 17, wherein the shaft 208'A engages in the hook member 204'A of the cartridge coupler 204. It will be noted that the hook 204'A member is arranged to be slightly flexible and to provide a slight snap when the shaft 208'A is pressed into engagement therewith. This of course, provides a secure connection between the two couplers and ensures that an unwanted disconnection does not occur during tape loading. This snap of course should be also selected to enable a quick and easy disconnection when tape has been wound back into the cartridge 202 and the link load arm 214 is swung from the connect position to the disconnect position.

Once a connection such as illustrated in FIG. 17 is established, the inner take-up hub 217B is rotated in a direction which winds in the take-up leader 110. This draws the intercoupled links 204', 208' along the guide tracks 210 and threads the cartridge leader 222 into an operative state within the drive 212. When the rear edge of the take-up link 208' enters the shaped recess defined in the inner and outer hubs 217B, 217A, and abuts a stop feature 224 formed on the inner periphery of the outer hub (see FIG. 20), the tension in the take-up leader 220 pulls the outer hub 217A and induces it to rotate synchronously with the inner one 217B. At the same time, the cartridge leader 222 has assumed the condition shown in FIG. 20, wherein the recess is filled, and the curved surface of the trailing edge of the cartridge link or coupler 204 assumes a position wherein it effectively forms part of the cylindrical surface of the outer hub.

As the outer hub 217A is drawn to rotate in unison with the inner one 217B, the cartridge leader 222 and the magnetic tape which is attached to the end of this leader, wind smoothly onto the outer hub without any distortion and loss of circularity.

When the tape is no longer required, the process is reversed and the supply reel 201 is driven to reel the magnetic tape back into the cartridge 202. The intercoupled links 204', 208' are drawn out of the recess 120 and move back along the guide tracks 210 until the situation depicted in FIG. 17 is established. At this time positioning features 204'-1 provided on the upper and lower edges of the cartridge link 204' are received in positioning features 202-1 formed on inner surfaces of the cartridge 202. The load link arm 214 is located in the load position so that as the intercoupled links 204', 208' approach the cartridge 202, the guide pins 208'A-1, which are sliding in the guide tracks 210, seat in position in the link load arm 214. The arm 214 is then swung from the position shown in FIG. 17 to that shown in FIG. 16 thus sliding the guide pins 208'A-1 along the loading guide track 218 and pulling the shaft 208'A out of the hook member 204'A and dissolving the intercoupling between the two links 204', 208.

Although the present invention has been disclosed with reference to only two basic embodiments, it will be noted that the present invention is not limited to these and is limited only by the scope of the appended claims. For example, while both embodiments have been disclosed as using a leader between the tape in the cartridge and the cartridge coupler, it is possible that a portion of the magnetic tape per se could be used for this purpose and that the provision of a separate piece of material could, in this instance, be feasibly omitted.

What is claimed is:

1. A tape arrangement comprising:

a first reel disposed in a first housing;

a first leader attached to the first reel;

a first coupling member provided on an end of said first leader;

a second reel, said second reel being disposed in a second housing which is separate from the first housing in which said first reel is disposed;

a second leader attached to said second reel; and a second coupling member provided at an end of said second leader, said second coupling member being releasably connectable with the first coupling member so as to permit the rotation of the first reel to wind the first leader back thereon and to draw the second leader onto the first reel;

wherein the first and second coupling members form a snap coupling; and wherein one of the first and second coupling members includes a post and the other of the first and second coupling members includes an elastically deformable sleeve with an open slot configured for receiving the post and extending over half of the circumference of the post.

2. A tape arrangement as set forth in claim 1, further comprising means for displacing one of the first and second coupling members with respect to the other so that intercoupling between the first and second coupling members takes place.

3. A tape arrangement as set forth in claim 2, wherein said displacing means comprises a mechanism which displaces the second housing in a first direction so as to move the second coupling member toward the first coupling member and to induce intercoupling to take place.

4. A tape arrangement as set forth in claim 2, wherein the first reel is formed with a recess which is so shaped and arranged as to receive the intercoupled first and second coupling members therein in a manner wherein the circular profile of the second reel is not interrupted, and to permit the first leader to wind on said second reel without loss of circularity.

5. A tape arrangement as set forth in claim 2, wherein the second housing comprises a cartridge which has a door hingedly mounted thereon, said cartridge further including lever means which operatively engages means provided in the first housing for opening the door when the second housing is inserted into a predetermined opening formed in the first housing.

6. A tape arrangement as set forth in claim 2, wherein the second housing is essentially rectangular in shape and wherein the door is provided at one corner of the rectangular housing.

7. A tape arrangement as set forth in claim 1, further comprising a tape which is contiguous with the second leader and which is interposed between said second leader and the second reel so as to be wound on the second reel prior to said second leader.

8. A tape arrangement as set forth in claim 1, wherein the first and second coupling members have shapes which are selected so that when intercoupled, the overall shape is smooth and foil-shaped to facilitate the passage from the second housing, via a tape guide structure disposed in the first housing, to said first reel.

9. A tape arrangement comprising:

a cartridge having a first reel rotatably supported therein, the first reel having a length of tape wound thereon;

a first connection member; and a first leader, said first leader being attached at a first end thereof to the first connection member and to the tape at a second end thereof, said first connection member being adapted to be releasably connected to a second connection member that is connected at an end of a second leader which is operatively connected with a second reel and which can be wound onto the second reel in a manner to draw the first and second connection members upon intercoupling thereof, to the second reel and to induce the first leader to wind onto the second reel;

wherein the first and second connection members form a snap coupling; and wherein one of the first and second connection members includes a post and the other of the first and second connection members includes an elastically deformable sleeve with an open slot configured for receiving the post and extending over half of the circumference of the post.

10. A tape arrangement as set forth in claim 9, further comprising: means disposed externally of the cartridge for moving the second connection member with respect to the first connection member in a manner wherein a male coupling portion formed on one of the first and second connection members is engageable in a female coupling portion formed on the other of the first and second coupling members.

11. A tape arrangement as set forth in claim 10, wherein said externally disposed moving means is arranged to move one of the first and second coupling members in a direction which is essentially normal to an axis of rotation of one of the first and second reels.

12. A tape arrangement comprising:

a take-up hub disposed in a tape drive;

a take-up connector member;

a take-up leader, said take-up leader having a first end connected with the take-up hub and a second end connected to the take-up connector member, said take-up leader being adapted to be wound onto the take-up reel in a manner which draws the take-up connector member back from a connecting position in the tape drive to a position wherein the take-up connector member becomes seated in a recess formed in the periphery of the take-up hub; and means for moving the take-up connector member into intercoupling engagement with a supply reel connector member which is connected to an end of a supply reel leader which operatively interconnects the supply reel connector member with a tape wound on the supply reel which is rotatably supported in a cartridge that is removably inserted into the tape drive; wherein the take-up connector member and the supply reel connector member form a snap coupling; and wherein one of the take-up connector member and the supply reel connector member includes a post and the other of the take-up connector member and the supply reel connector member includes an elastically deformable sleeve with an open slot configured for receiving the post and extending over half of the circumference of the post.

13. A tape arrangement as set forth in claim 12, further comprising guide track means for guiding the take-up connector along a predetermined path which leads from the connecting position to a position proximate the take-up hub.

14. A tape arrangement as set forth in claim 12, further comprising a pivotal loading arm which is adapted to hold the take-up connector member and to move it along a shunt path which extends from the connecting position to a disconnecting position, said loading arm being operative to maintain the take-up connector in the disconnecting position until a cartridge is inserted into the drive and then move the take-up connector member back to the connecting position wherein engagement between the take-up connector member and the supply reel connector member occurs.

* * * * *